United States Patent
Voglewede et al.

(10) Patent No.: US 10,119,339 B2
(45) Date of Patent: Nov. 6, 2018

(54) ALTERNATIVE MATERIALS FOR MANDREL IN INFILTRATED METAL-MATRIX COMPOSITE DRILL BITS

(71) Applicant: Halliburton Energy Services, Inc., Houston, TX (US)

(72) Inventors: Daniel Brendan Voglewede, Spring, TX (US); Jeffrey G. Thomas, Magnolia, TX (US); Grant O. Cook, III, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

(21) Appl. No.: 14/905,314

(22) PCT Filed: Mar. 31, 2015

(86) PCT No.: PCT/US2015/023523
§ 371 (c)(1),
(2) Date: Jan. 15, 2016

(87) PCT Pub. No.: WO2016/159971
PCT Pub. Date: Oct. 6, 2016

(65) Prior Publication Data
US 2017/0107766 A1      Apr. 20, 2017

(51) Int. Cl.
*E21B 10/54*    (2006.01)
*E21B 10/46*    (2006.01)
(Continued)

(52) U.S. Cl.
CPC ........... *E21B 10/46* (2013.01); *B22D 19/02* (2013.01); *B22D 19/04* (2013.01); *B22D 19/14* (2013.01);
(Continued)

(58) Field of Classification Search
CPC .......... E21B 10/42; E21B 10/46; E21B 10/54; B23P 15/28
See application file for complete search history.

(56) References Cited

U.S. PATENT DOCUMENTS 7,347,882 B2    3/2008   Cooper et al.
7,395,884 B2    7/2008   Kembaiyan et al.
(Continued)

FOREIGN PATENT DOCUMENTS

GB        2490087        10/2012
WO    2010088480 A2      8/2010

OTHER PUBLICATIONS

International Search Report and Written Opinion for PCT/US2015/023523 dated Dec. 7, 2015.
(Continued)

*Primary Examiner* — Kenneth L Thompson
(74) *Attorney, Agent, or Firm* — Alan Bryson; Tumey L.L.P.

(57) ABSTRACT

An infiltrated metal-matrix composite drill bit includes a bit body comprising a reinforced composite material including reinforcing particles infiltrated with a binder material. A plurality of cutting elements is coupled to an exterior of the bit body. A mandrel is positioned within the bit body and made of an M-based alloy selected from the group consisting of a titanium-based alloy, a nickel-based alloy, a copper-based alloy, a cobalt-based alloy, and a refractory metal-based alloy, wherein the element designated by "M" is the most prevalent element in the alloy composition. A shank is coupled to the mandrel.

21 Claims, 4 Drawing Sheets

(51) Int. Cl.
*E21B 10/55* (2006.01)
*B22D 19/02* (2006.01)
*B22D 19/04* (2006.01)
*B22D 19/14* (2006.01)
*B22D 25/02* (2006.01)
*B23K 1/00* (2006.01)
*B23K 13/01* (2006.01)
*B23K 20/00* (2006.01)
*B23K 20/02* (2006.01)
*B23K 20/12* (2006.01)
*E21B 10/60* (2006.01)
*B22F 7/06* (2006.01)
*C22C 1/10* (2006.01)
*C22C 29/06* (2006.01)
*B22F 5/00* (2006.01)

(52) U.S. Cl.
CPC ............ *B22D 25/02* (2013.01); *B23K 1/0008* (2013.01); *B23K 13/015* (2013.01); *B23K 20/002* (2013.01); *B23K 20/028* (2013.01); *B23K 20/122* (2013.01); *B23K 20/129* (2013.01); *E21B 10/54* (2013.01); *E21B 10/55* (2013.01); *B22F 2005/001* (2013.01); *B22F 2007/066* (2013.01); *C22C 1/1036* (2013.01); *C22C 29/067* (2013.01); *E21B 10/60* (2013.01)

(56) References Cited

U.S. PATENT DOCUMENTS

| | | | |
|---|---|---|---|
| 8,561,727 | B1 | 10/2013 | Pope et al. |
| 8,746,367 | B2 | 6/2014 | DiGiovanni et al. |
| 9,206,651 | B2 * | 12/2015 | Stevens .................. E21B 10/00 |
| 9,752,204 | B2 * | 9/2017 | Voglewede .............. C21D 1/18 |
| 2007/0102199 | A1 | 5/2007 | Smith et al. |
| 2008/0011519 | A1 | 1/2008 | Smith et al. |
| 2010/0288821 | A1 | 11/2010 | Ladi et al. |
| 2011/0088330 | A1 | 4/2011 | Beekman |
| 2011/0107586 | A1 | 5/2011 | Choe et al. |
| 2013/0312927 | A1 | 11/2013 | Thomas |
| 2013/0316149 | A1 | 11/2013 | Atkins et al. |
| 2013/0333950 | A1 | 12/2013 | Atkins et al. |

OTHER PUBLICATIONS

Chinese Office Action for Application No. 201580077151.X dated Aug. 28, 2018.

* cited by examiner

ALTERNATIVE MATERIALS FOR MANDREL IN INFILTRATED METAL-MATRIX COMPOSITE DRILL BITS

BACKGROUND

Rotary drill bits are often used to drill oil and gas wells, geothermal wells, and water wells. One type of rotary drill bit is a fixed-cutter drill bit having a bit body comprising matrix and reinforcement materials, commonly referred to as a matrix drill bit or an infiltrated metal-matrix composite (MMC) drill bit. MMC drill bits are typically manufactured by depositing powder reinforcement materials into a mold cavity and subsequently combining the reinforcement materials at elevated temperatures with a binder material, such as a metallic alloy. The various features of the resulting MMC drill bit, such as blades, cutter pockets, and/or fluid-flow passageways, may be provided by shaping the mold cavity and/or by positioning temporary displacement material within interior portions of the mold cavity. A preformed metal blank or mandrel may be placed within the mold cavity to provide reinforcement for the MMC bit body and to help facilitate attachment of the resulting MMC drill bit to a drill string following fabrication.

The mandrel used in infiltrated MMC drill bits is typically made of a common steel grade material and is weldable to a hardened steel upper shoulder connection or "shank" of the MMC drill bit that facilitates connection of the MMC drill bit to drill string. The mandrel also provides toughness and support/structure to the MMC drill bit as it withstands and transmits the applied forces and torque during drilling operations. During the aforementioned infiltration process, a joint is formed as a braze-like bond between the mandrel and the matrix reinforcement materials to form the head of the MMC drill bit. The integrity of the joint is critical in ensuring that a separation event between the head of the MMC drill bit and the shank does not occur during drilling.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
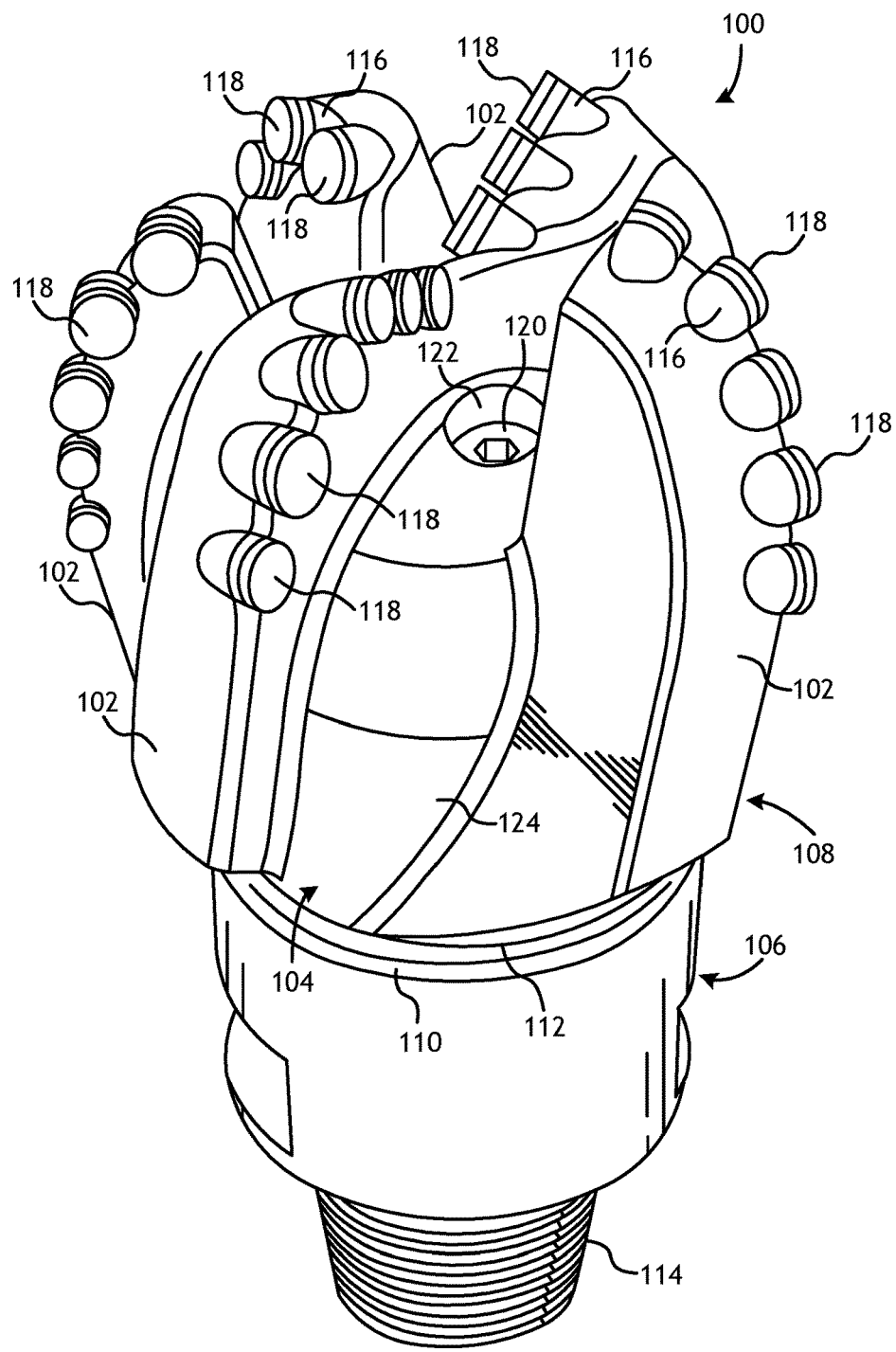
FIG. 1 is a perspective view of an exemplary drill bit that may be fabricated in accordance with the principles of the present disclosure.

The present disclosure is related to drill bits used in the oil and gas industry and, more particularly, to metal-matrix composite drill bits that incorporate the use of an alternative mandrel material to reduce defect rates and/or yield a more robust infiltration process.

Through careful detailed and analysis in the development of the disclosed embodiments, various observations have been made regarding molding processes for metal-matrix composite (MMC) drill bits. In particular, for example, it has been determined that during the infiltration and cooling processes described above for an MMC drill bit, a common steel grade mandrel may react with the binder material and can cause problems. For example, the iron from the steel tends to migrate out of the mandrel into the binder material via diffusion, chemical erosion, etc., thereby resulting in the formation of deleterious phases with the binder material and/or reinforcing particles of the reinforcement materials. Moreover, chemical interaction between the mandrel material and the reinforcement materials could give rise to the formation of a thick region of intermetallic phases that may embrittle the joint.

Furthermore, the coefficient of thermal expansion (CTE) difference between the steel mandrel and a copper- or nickel-based, tungsten carbide-reinforced MMC drill bit may cause porosity and/or hot tearing during the cooling and solidification processes, which may lead to defects such as bond-line cracking at the interface between the materials. The CTE mismatch between the mandrel and the MMC material can be exacerbated by allotropic phase changes within the mandrel material (e.g., austenite/ferrite in some steels, which occurs above about 1350° F.), which can lead to a joint that is thicker and, therefore, weaker. CTE mismatches between the mandrel and the MMC material can also create regions around the joint that are devoid of any powder reinforcement material. For instance, the austenite-to-ferrite transformation (cooling) temperature range changes depending on the steel alloy composition; the abruptness of the transformation is increased or decreased by varying the alloy composition. Such regions, known as binder-rich zones, often exhibit reduced strength due to the lack of reinforcement materials. CTE mismatches can also provide a source of stress that can lead to a hot crack in the joint.

Embodiments of the present disclosure describe the use of a mandrel made from alternative materials in fabricating an infiltrated metal-matrix composite drill bit. As opposed to a mandrel made from a common steel grade, the mandrels of the present disclosure may be made of an M-based alloy composition, wherein the element designated by "M" is the most prevalent element in the alloy composition. Suitable M-based alloys that may be selected for the mandrel include, but are not limited to, a titanium-based alloy, a nickel-based alloy, a copper-based alloy, a cobalt-based alloy, and a refractory metal-based alloy. Combinations of these may be suitable as well. Using an M-based alloy for the mandrel may prevent the mandrel from experiencing deleterious reactions with a binder material and/or a reinforcement material during an infiltration process. Moreover, the M-based alloys may exhibit less of a CTE mismatch as compared to common steel grade mandrels, which may reduce defect rates and yield a more robust fabrication process.

Referring to FIG. 1, illustrated is a perspective view of an example metal-matrix composite (MMC) drill bit 100 that may be fabricated in accordance with the principles of the present disclosure. While the MMC drill bit 100 is depicted as a fixed-cutter drill bit, the principles of the present disclosure may equally be applied to other types of MMC drill bits including, but not limited to, fixed-angle drill bits, roller-cone drill bits, coring drill bits, bi-center drill bits, and impregnated drill bits, without departing from the scope of the disclosure.

As illustrated in FIG. 1, the MMC drill bit 100 may include or otherwise define a plurality of cutter blades 102 arranged along the circumference of a bit head 104. The bit head 104 is connected to a shank 106 to form a bit body 108.

The shank 106 may be connected to the bit head 104 by welding, for example, which results in the formation of a weld 110 around a weld groove 112. As discussed below, however, the shank 106 may alternatively be connected to the bit head 104 via other processes, such as a friction-stir weld, a friction weld, an inertial weld, an induction weld, a braze, a diffusion bond, a transient liquid phase bond, etc., in keeping with the scope of the present disclosure. The shank 106 may further include or otherwise be connected to or integral with a threaded pin 114, such as an American Petroleum Institute (API) drill pipe thread. Consequently, the shank 106 may allow the MMC drill bit 100 to be coupled to drill pipe for drilling operations.

In the depicted example, the MMC drill bit 100 includes five cutter blades 102 in which multiple recesses or pockets 116 are formed. Cutting elements 118 may be fixedly installed within each pocket 116. This can be done, for example, by brazing each cutting element 118 into a corresponding pocket 116. As the MMC drill bit 100 is rotated in use to drill a wellbore, the cutting elements 118 engage rock and underlying earthen materials, to dig, scrape or grind away the material of the formation being penetrated.

During drilling operations, drilling fluid or "mud" can be pumped downhole through a drill string (not shown) coupled to the MMC drill bit 100 at the threaded pin 114. The drilling fluid circulates through and out of the MMC drill bit 100 at one or more nozzles 120 positioned in nozzle openings 122 defined in the bit head 104. Junk slots 124 are formed between each adjacent pair of cutter blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Figure 2:
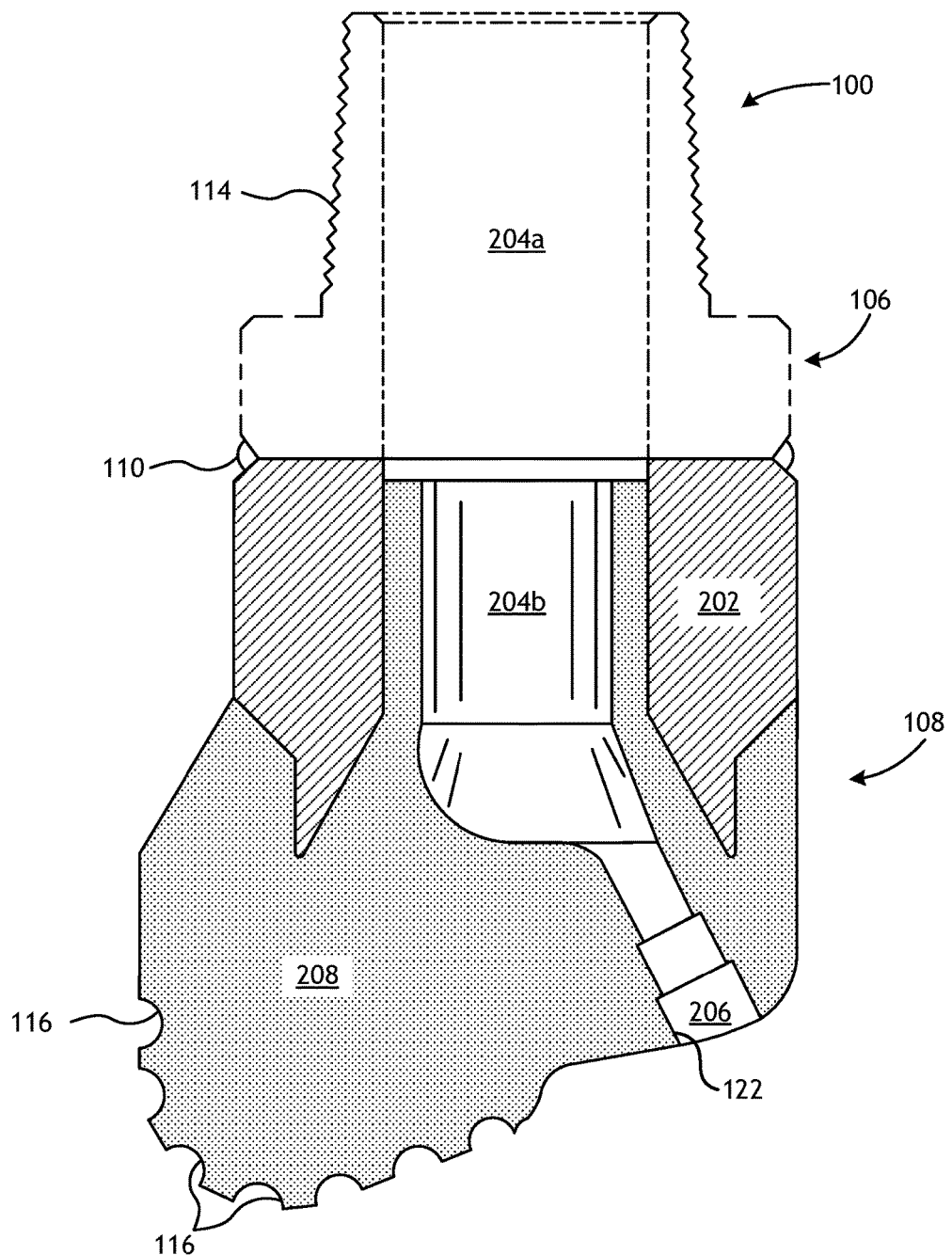
FIG. 2 is a cross-sectional view of the drill bit of FIG. 1.

FIG. 2 is a cross-sectional side view of the MMC drill bit 100 of FIG. 1. Similar numerals from FIG. 1 that are used in FIG. 2 refer to similar components that may not be described again. As illustrated, the shank 106 may be securely attached to a mandrel 202, sometimes referred to as a "metal blank," which extends into the bit body 108. The shank 106 and the mandrel 202 are generally cylindrical structures that define corresponding fluid cavities 204a and 204b, respectively, in fluid communication with each other. The fluid cavity 204b of the mandrel 202 may further extend longitudinally into the bit body 108. At least one flow passageway 206 (one shown) may extend from the fluid cavity 204b to exterior portions of the bit body 108. The nozzle openings 122 (one shown in FIG. 2) may be defined at the ends of the flow passageways 206 at the exterior portions of the bit body 108. The pockets 116 are formed in the bit body 108 and are shaped or otherwise configured to subsequently receive the cutting elements 118 (FIG. 1). Following the infiltration process described herein below, the resulting bit body 108 may include a reinforced composite material 208 secured to the mandrel 202.

Figure 3:
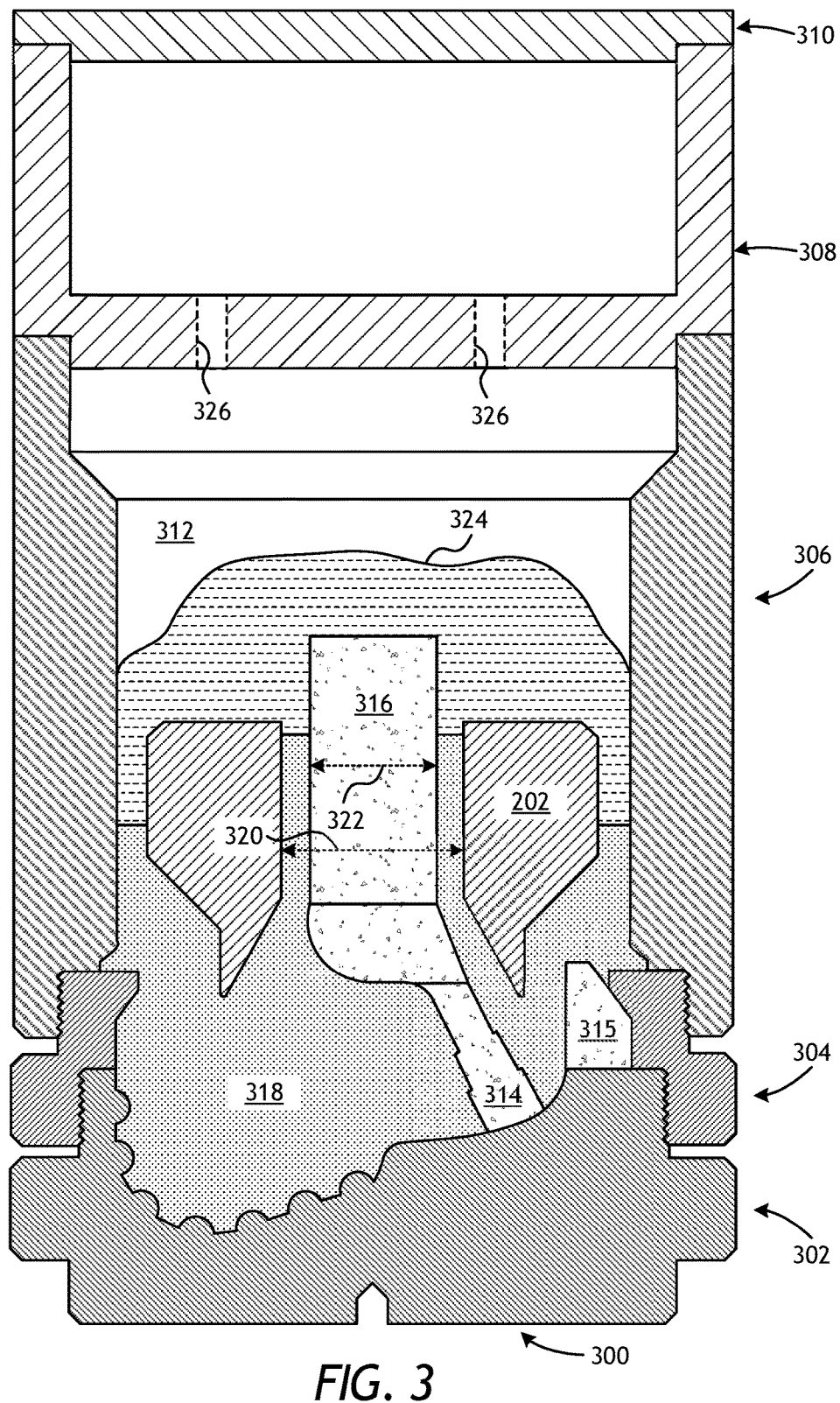
FIG. 3 is a cross-sectional side view of an exemplary mold assembly for use in forming the drill bit of FIG. 1.

FIG. 3 is a cross-sectional side view of a mold assembly 300 that may be used to form the MMC drill bit 100 of FIGS. 1 and 2. As illustrated, the mold assembly 300 may include several components such as a mold 302, a gauge ring 304, and a funnel 306. In some embodiments, the funnel 306 may be operatively coupled to the mold 302 via the gauge ring 304, such as by corresponding threaded engagements, as illustrated. In other embodiments, the gauge ring 304 may be omitted from the mold assembly 300 and the funnel 306 may instead be directly coupled to the mold 302, such as via a corresponding threaded engagement, without departing from the scope of the disclosure.

In some embodiments, as illustrated, the mold assembly 300 may further include a binder bowl 308 and a cap 310 placed above the funnel 306. The mold 302, the gauge ring 304, the funnel 306, the binder bowl 308, and the cap 310 may each be made of or otherwise comprise graphite or alumina ($Al_2O_3$), for example, or other suitable materials. An infiltration chamber 312 may be defined or otherwise provided within the mold assembly 300. Various techniques may be used to manufacture the mold assembly 300 and its components including, but not limited to, machining graphite blanks to produce the various components and thereby define the infiltration chamber 312 to exhibit a negative or reverse profile of desired exterior features of the MMC drill bit 100 (FIGS. 1 and 2).

Displacement materials, such as consolidated sand or graphite, may be positioned within the mold assembly 300 at desired locations to form various features of the MMC drill bit 100 (FIGS. 1 and 2). For example, one or more consolidated legs 314 (one shown) may be positioned to correspond with desired locations and configurations of the flow passageways 206 (FIG. 2) and their respective nozzle openings 122 (FIGS. 1 and 2). A cylindrically-shaped central displacement 316 may be placed on the legs 314 to form the fluid cavity 204b (FIG. 2). As will be appreciated, the number of legs 314 extending from the central displacement 316 will depend upon the desired number of flow passageways and corresponding nozzle openings 122 in the MMC drill bit 100. Moreover, one or more junk slot displacements 315 may also be positioned within the mold assembly 300 to correspond with the junk slots 124 (FIG. 1). Further, cutter-pocket displacements (shown as part of the mold 302 in FIG. 3) may be placed in the mold 302 to form cutter pockets 116 (FIG. 2).

After the desired displacement materials (e.g., the central displacement 316, the legs 314, the junk-slot displacement 315, etc.) have been positioned within the mold assembly 300, reinforcement materials 318 may then be placed within or otherwise introduced into the mold assembly 300. The reinforcement materials 318 may include various types of reinforcing particles. Suitable reinforcing particles include, but are not limited to, particles of metals, metal alloys, superalloys, intermetallics, borides, carbides, nitrides, oxides, ceramics, diamonds, and the like, or any combination thereof. In some embodiments, as described in more detail below, the reinforcing particles may be selected based on the material of the mandrel 202 and how the reinforcing particles might react with the mandrel 202 during the infiltration process.

Examples of suitable reinforcing particles include, but are not limited to, tungsten, molybdenum, niobium, tantalum, rhenium, iridium, ruthenium, beryllium, titanium, chromium, rhodium, iron, cobalt, uranium, nickel, nitrides, silicon nitrides, boron nitrides, cubic boron nitrides, natural diamonds, synthetic diamonds, cemented carbide, spherical carbides, low-alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, cobalt alloys, chromium alloys, HAS-TELLOY® alloys (i.e., nickel-chromium containing alloys, available from Haynes International), INCONEL® alloys (i.e., austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), INCOLOY® alloys (i.e., iron-nickel containing superalloys available from Mega Mex), MP98T (i.e., a nickel-copper-chromium superalloy available from SPS Technologies), TMS alloys, CMSX® alloys (i.e., nickel-based superalloys available from C-M Group), cobalt alloy 6B (i.e., cobalt-based superalloy available from HPA), N-155 alloys, any mixture thereof, and any combination thereof. In some embodiments, the reinforcing particles may be coated, such as diamond coated with titanium.

The mandrel 202 may be supported at least partially by the reinforcement materials 318 within the infiltration chamber 312. More particularly, after a sufficient volume of the reinforcement materials 318 has been added to the mold assembly 300, the mandrel 202 may then be placed within the mold assembly 300. The mandrel 202 may include an inside diameter 320 that is greater than an outside diameter 322 of the central displacement 316, and various fixtures (not expressly shown) may be used to position the mandrel 202 within the mold assembly 300 at a precise alignment location. The reinforcement materials 318 may then be filled to a desired level within the infiltration chamber 312.

Binder material 324 may then be placed on top of the reinforcement materials 318, the mandrel 202, and the central displacement 316. Similar to the selection of the reinforcing particles, in some embodiments, the binder material 324 may be selected based on the material of the mandrel 202 and how the binder material 324 might react with the mandrel 202 during the infiltration process. Suitable binder materials 324 include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Non-limiting examples of alloys of the binder material 324 may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof. Examples of commercially-available binder materials 324 include, but are not limited to, VIRGIN™ Binder 453D (copper-manganese-nickel-zinc, available from Belmont Metals, Inc.), and copper-tin-manganese-nickel and copper-tin-manganese-nickel-iron grades 516, 519, 523, 512, 518, and 520 available from ATI Firth Sterling; and any combination thereof.

In some embodiments, the binder material 324 may be covered with a flux layer (not expressly shown). The amount of binder material 324 (and optional flux material) added to the infiltration chamber 312 should be at least enough to infiltrate the reinforcement materials 318 during the infiltration process. In some instances, some or all of the binder material 324 may be placed in the binder bowl 308, which may be used to distribute the binder material 324 into the infiltration chamber 312 via various conduits 326 that extend therethrough. The cap 310 (if used) may then be placed over the mold assembly 300. The mold assembly 300 and the materials disposed therein may then be preheated and subsequently placed in a furnace (not shown). When the furnace temperature reaches the melting point of the binder material 324, the binder material 324 will liquefy and proceed to infiltrate the reinforcement materials 318.

After a predetermined amount of time allotted for the liquefied binder material 324 to infiltrate the reinforcement materials 318, the mold assembly 300 may then be removed from the furnace and cooled at a controlled rate. Once cooled, the mold assembly 300 may be broken away to expose the bit body 108 (FIGS. 1 and 2). Subsequent machining and post-processing according to well-known techniques may then be used to finish the MMC drill bit 100 (FIG. 1).

During the infiltration process, a joint is formed as a braze-like bond between the mandrel 202 and the reinforced composite material 208 (FIG. 2). The strength of this joint helps ensure that a separation event between the bit head 104 (FIG. 2) and the shank 106 (FIG. 2) does not occur during drilling operations.

In the prior art, mandrels similar to the mandrel 202 have typically been made from a common steel grade material, such as AISI 1018 or AISI 1020. Such common steel grade mandrels, however, can cause problems during the above-described infiltration and cooling processes, as the steel grade mandrel reacts with the binder material 324. In some cases, for instance, the iron may migrate out of the common steel grade mandrel via diffusion or chemical erosion to form deleterious phases with the binder material 324 and/or the reinforcing particles of the reinforcement materials 318.

Moreover, chemical interaction between a common steel grade mandrel and the reinforced composite material 208 may result in the formation of a thick region of intermetallic phases that can embrittle the joint. More particularly, the difference in coefficient of thermal expansion (CTE) between a common steel grade mandrel and the reinforced composite material 208 can cause porosity, hot tearing, hot cracks, etc. during the solidification process, which can result in bond-line cracking. The CTE mismatch can be exacerbated by allotropic phase changes within the material of the common steel grade mandrel (e.g., austenite/ferrite in some steels, which occurs above about 1350° F.), which can lead to joints that are thicker and weaker. CTE mismatches can also create binder-rich zones around the joint wherein the reinforcing particles of the reinforcement materials 318 are forced out by the thermal expansion of the common steel grade mandrel and replaced with the binder material 324. Due to the lack of reinforcing particles, these binder-rich regions exhibit reduced strength.

According to embodiments of the present disclosure, however, the mandrel 202 may alternatively be made of a material that may solve some or all of the aforementioned problems by preventing deleterious reactions with the binder material 324 and/or the reinforcement material 318 and having less of a CTE mismatch, which may reduce defect rates and yield a more robust fabrication process. The presently disclosed materials for the mandrel 202 may mitigate or prevent one or more of the aforementioned problems that frequently affect common steel grade mandrels. As described below, the mandrel 202 may be made of an M-based alloy, where the element designated by "M" is the most prevalent element in the alloy composition as measured by atomic percent. In such cases, alloys are often designated by the element with the largest percentage (e.g., M). As will be appreciated, the element M need not comprise a majority of the alloy composition (i.e., at least 50%) as many alloys are composed of large amounts of a few elements. For instance, an exemplary M-based alloy may contain 35% M, 30% $E_2$, 25% $E_3$, and 10% $E_4$, where $E_2$, $E_3$, and $E_4$ are second, third, and fourth elements, respectively, in the alloy composition. In other embodiments, however, the element designated by "M" may be the most prevalent element in the alloy composition as measured by weight, without departing from the scope of the disclosure.

Suitable M-based alloys that may be selected for the mandrel 202 include, but are not limited to, a titanium-based alloy, a nickel-based alloy, a copper-based alloy, a cobalt-based alloy, and a refractory metal-based alloy. Example titanium-based alloys contain titanium as the most prevalent element in the alloy, measured by atomic percent or weight, such as commercially pure titanium, and include titanium oxide, titanium-aluminum-vanadium, titanium-palladium, titanium-molybdenum-nickel, titanium-aluminum-tin, titanium-aluminum-tin-zirconium-molybdenum, titanium-vanadium-iron-aluminum, and titanium-aluminum-vanadium-chromium-zirconium-molybdenum.

Example nickel-based alloys contain nickel as the most prevalent element in the alloy, measured by atomic percent or weight, such as commercially pure nickel, nickel-copper, nickel-chromium, nickel-chromium-iron, nickel-chromium-molybdenum, nickel-molybdenum, HASTELLOY® alloys (i.e., nickel-chromium containing alloys, available from Haynes International), INCONEL® alloys austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), MP98T (i.e., a nickel-copper-chromium superalloy available from SPS Technologies), TMS alloys, CMSX® alloys (i.e., nickel-based superalloys available from C-M Group).

Example copper-based alloys contain copper as the most prevalent element in the alloy, measured by atomic percent or weight, such as commercially pure copper, copper-zinc, copper-zinc-nickel, copper-tin, copper-tin-aluminum, or copper-nickel.

Exemplary cobalt-based alloys contain cobalt as the most prevalent element in the alloy, measured by atomic percent or weight, such as commercially pure cobalt, AMS 5789D, cobalt-chromium, cobalt-chromium-tungsten, cobalt-chromium-molybdenum, cobalt-chromium-nickel, cobalt-chromium-nickel-molybdenum, or cobalt alloy 6B (i.e., cobalt-based superalloy available from HPA).

Example refractory metal-based alloys contain the refractory metal as the most prevalent element in the alloy, measured by atomic percent or weight. Examples of refractory metals incorporated in this application include tantalum, tungsten, rhenium, molybdenum, niobium, hafnium, zirconium, and vanadium. Examples of refractory metal-based alloys include tantalum-tungsten, tantalum-tungsten-molybdenum, tantalum-tungsten-rhenium, tantalum-tungsten-molybdenum-rhenium, tantalum-tungsten-zirconium, tungsten-rhenium, tungsten-molybdenum, tungsten-rhenium-molybdenum, tungsten-molybdenum-hafnium, tungsten-molybdenum-zirconium, tungsten-ruthenium, niobium-vanadium, niobium-vanadium-titanium, niobium-zirconium, niobium-tungsten-zirconium, niobium-hafnium-titanium, or niobium-tungsten-hafnium.

In some embodiments, for example, the mandrel 202 may comprise a copper- or nickel-based alloy, where copper or nickel is the most prevalent element in the alloy, measured by atomic percent or weight. In such embodiments, the copper- or nickel-based alloy may exhibit a chemical congruity with the binder material 324 used in the infiltration process, and thereby reduce or eliminate the formation of many deleterious phases. Moreover, the bond between a copper- or nickel-based alloy mandrel 202 and the binder material 324 may more closely resemble a diffusion bond than a braze, which could lead to a more gradual transition in material properties and/or stress distribution between the dissimilar materials.

In other embodiments, the mandrel 202 may comprise a tungsten-based alloy, where tungsten is the most prevalent element in the alloy, measured by atomic percent or weight. In such embodiments, the tungsten-based alloy may exhibit a chemical congruity with the reinforcement materials 318 and, more particularly, with tungsten carbide reinforcing particles. Moreover, the tungsten-based alloy may interact with the binder material 324 in a similar manner as the binder material 324 interacts with the tungsten carbide reinforcing particles. As a result, whatever reactions occur between the binder material 324 and the tungsten carbide reinforcing particles may serve to enhance the bond between the tungsten-based alloy mandrel 202 and the reinforced composite material 208 (FIG. 2).

In yet other embodiments, the mandrel 202 may comprise a refractory metal alloy, where a refractory metal is the most prevalent element in the alloy, measured by atomic percent or weight. In at least one embodiment, the refractory metal may comprise tantalum, niobium, or vanadium, each of which may provide chemical congruity between the mandrel 202 and the reinforced composite material 208 made from reinforcement materials 324 such as oxides, carbides, nitrides, and borides of titanium, niobium, vanadium, tantalum, hafnium, and zirconium, for example.

As will be appreciated, how the mandrel 202 is coupled to the shank 106 (FIGS. 1 and 2) may depend on the M-based alloy or material selected for the mandrel 202. Fusion welding, such as laser arc welding, is often used to join a common steel grade mandrel to the shank 106. Selection of one of the M-based alloy listed herein, however, may allow or require that the mandrel 202 to be coupled to the shank 106 via an alternative joining or welding process such as, but not limited to, inertial welding, a friction-stir weld, a friction weld, an inertial weld, an induction weld, a braze, diffusion bonding, transient liquid phase (TLP) bonding, and any combination thereof. Friction-stir welding, for instance, may be capable of producing a robust joint between dissimilar material types. In at least one embodiment, for example, the mandrel 202 may comprise a titanium-based alloy friction-stir welded to the shank 106 to reduce the inertial mass of the MMC drill bit 100 (FIGS. 1 and 2) and provide reduced power requirements for drilling operations.

Selection of certain M-based alloys for the mandrel 202 may result in less of a CTE mismatch between the mandrel 202 and reinforcement materials 318 during infiltration. The CTE of a common steel grade mandrel ranges from about 10 ppm/° C. to about 14 ppm/° C. over a temperature range extending between about 100° C. and about 700° C. In contrast, the CTE of an M-based alloy mandrel 202 ranges from about 7 to about 11 ppm/° C. or about 9 to about 15 ppm/° C. over the same temperature range, depending primarily on which additional elements are used in the M-based alloy. In the 100° C. to 700° C. temperature range, the mandrel 202 thermally expands against the reinforcing particles (e.g., tungsten carbide), which exhibit a lower CTE. Such thermal expansion could potentially compact the reinforcing particles locally around the mandrel 202, as compared to the rest of the bit body 108 (FIG. 2), thereby making it more difficult for the binder material 324 (FIG. 3) to infiltrate those regions.

Above the 700° C. threshold, the CTE of the mandrel 202 decreases as it approaches about 850° C., after which point it starts to increase again, due to the allotropic phase transformation. The overall effect can be that the locally compacted tungsten carbide particles retain their overall shape around the mandrel 202, leaving a gap during this CTE transition experienced by the mandrel. The infiltration of the reinforcing particles occurs after this cubic CTE behavior, which leads to even larger CTE mismatches between the mandrel 202 and the resulting reinforced composite material 208 (FIG. 2). Further, on cooling, this cubic behavior can lead to the mandrel 202 pushing back on the surrounding reinforced composite material 208, and thereby leading to a potentially undesirable residual stress state. According to the present disclosure, using alternative materials for the mandrel 202, such as one of the refractory metal-based alloys described herein, may result in a lower CTE for the mandrel 202 that may more closely match the CTE of the reinforcement materials 318 (FIG. 3). Moreover, copper, molybdenum, niobium, nickel, rhenium, tantalum, vanadium, and tungsten do not exhibit allotropic phase transformations. In other words, the CTE of such materials as a function of temperature will not exhibit non-linear behavior, such as those experienced in allotropic steels.

Due to the chemical congruity between the reinforcement materials 318 and many of the proposed M-based alloys for the mandrel 202, however, the infiltration process might be amenable to thermally soaking the drill bit 100 (FIGS. 1 and 2) for longer periods of time. When using a common steel grade mandrel, thermal soaking often produces many defects, likely due to the interaction of iron with the binder material 324 (FIG. 3) and/or the reinforcement particles (e.g., tungsten carbide) of the reinforcement materials 318 (FIG. 3). As will be appreciated, in certain cases, thermal soaking during the infiltration process might be desirable to prevent other defects, such as porosity or lack of infiltration, or to enhance/produce other material properties in the drill bit 100, such as modified residual-stress profiles or aged or precipitation-hardened structures.

In some embodiments, the outer surfaces of the mandrel 202 may be generally smooth, as shown in FIGS. 2 and 3. In other embodiments, however, some or all of the outer surfaces of the mandrel 202 may comprise macroscopic surface features such as, but not limited to, small-scale undulations, crenellations, steps, waves, dimples, recesses, protrusions, nubs, fins, threads, miters, dovetails, knurling, any combination thereof, and the like. Such surface features may be formed in the outer surfaces of the mandrel 202 such as by shot peening, machining, and the like to enhance bonding between the mandrel 202 and the reinforced composite material 208 (FIG. 2). As will be appreciated, the surface features may prove advantageous in increasing the bonding surface area between the mandrel 202 and the reinforced composite material 208, and increasing the surface area may promote adhesion and enhance shearing strength between the two macroscopic regions.

Figure 4:
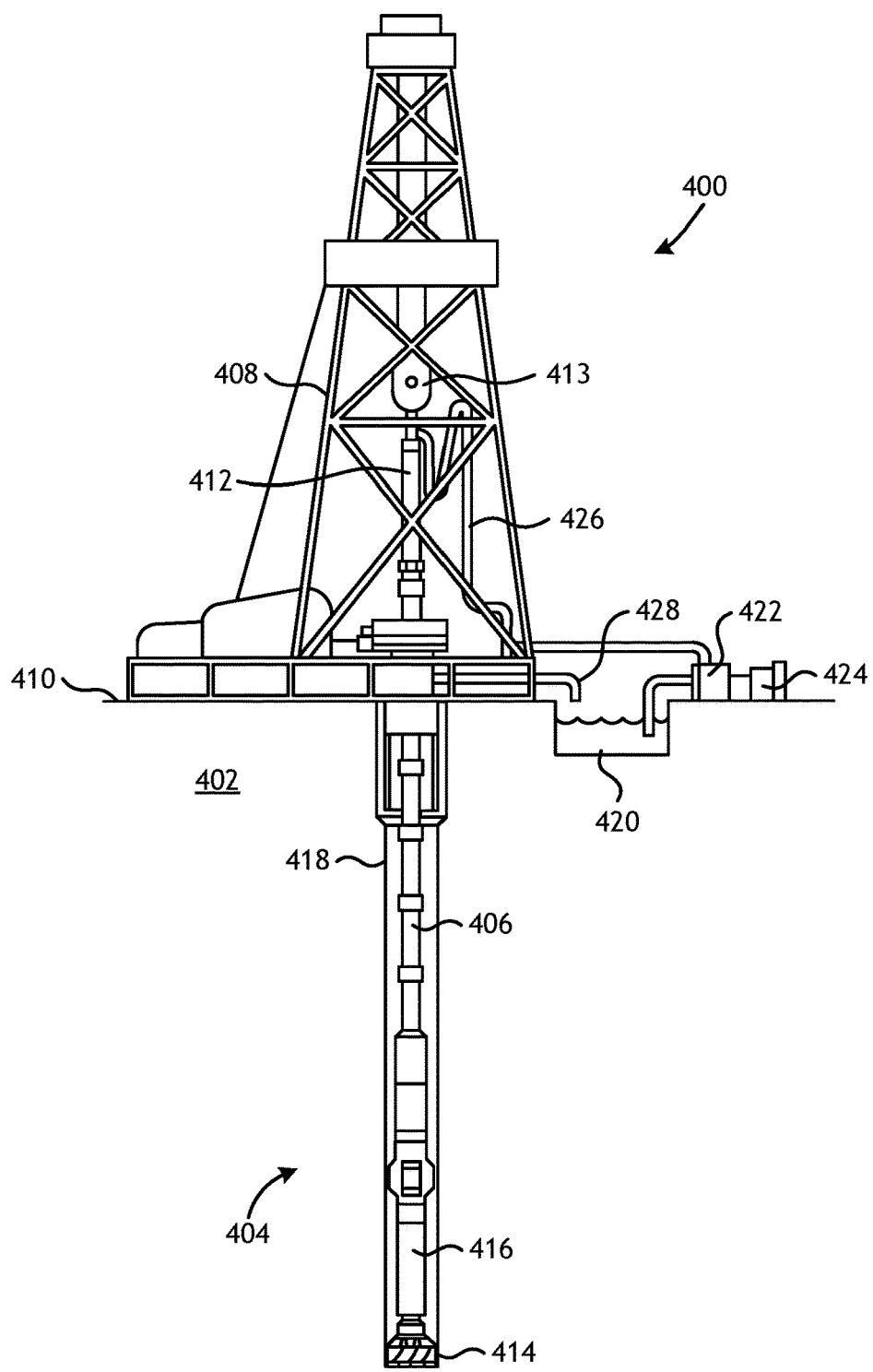
FIG. 4 is an exemplary drilling system that uses a drill bit that may employ one or more principles of the present disclosure.

Referring now to FIG. 4, illustrated is an exemplary drilling system 400 that may employ a drill bit manufactured according to the principles of the present disclosure. Boreholes may be created by drilling into the earth 402 using the drilling system 400. The drilling system 400 may be configured to drive a bottom hole assembly (BHA) 404 positioned or otherwise arranged at the bottom of a drill string 406 extended into the earth 402 from a derrick 408 arranged at the surface 410. The derrick 408 includes a kelly 412 and a traveling block 413 used to lower and raise the kelly 412 and the drill string 406.

The BHA 404 may include a drill bit 414 operatively coupled to a tool string 416 which may be moved axially within a drilled wellbore 418 as attached to the drill string 406. The drill bit 414 may be fabricated and otherwise created in accordance with the principles of the present disclosure and, more particularly, with a mandrel 202 (FIGS. 2 and 3) made from an M-based alloy or material. During operation, the drill bit 414 penetrates the earth 402 and thereby creates the wellbore 118. The BHA 404 provides directional control of the drill bit 414 as it advances into the earth 402. The tool string 416 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 416, as shown in FIG. 4.

Drilling fluid or "mud" from a mud tank 420 may be pumped downhole using a mud pump 422 powered by an adjacent power source, such as a prime mover or motor 424. The mud may be pumped from the mud tank 420, through a stand pipe 426, which feeds the mud into the drill string 406 and conveys the same to the drill bit 414. The mud exits one or more nozzles arranged in the drill bit 414 and in the process cools the drill bit 414. After exiting the drill bit 414, the mud circulates back to the surface 410 via the annulus defined between the wellbore 418 and the drill string 106, and in the process returns drill cuttings and debris to the surface. The cuttings and mud mixture are passed through a flow line 428 and are processed such that a cleaned mud is returned down hole through the stand pipe 426 once again.

Although the drilling system 400 is shown and described with respect to a rotary drill system in FIG. 4, those skilled in the art will readily appreciate that many types of drilling systems can be employed in carrying out embodiments of the disclosure. For instance, drills and drill rigs used in embodiments of the disclosure may be used onshore (as depicted in FIG. 1) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

Embodiments disclosed herein include:

A. An infiltrated metal-matrix composite (MMC) drill bit that includes a bit body comprising a reinforced composite material including reinforcing particles infiltrated with a binder material, a plurality of cutting elements coupled to an exterior of the bit body, a mandrel positioned within the bit body and made of an M-based alloy selected from the group consisting of a titanium-based alloy, a nickel-based alloy, a copper-based alloy, a cobalt-based alloy, and a refractory metal-based alloy, wherein the element designated by "M" is the most prevalent element in the alloy composition, and a shank coupled to the mandrel.

B. A method of fabricating an infiltrated metal-matrix composite (MMC) drill bit, the method including positioning a mandrel in an interior of a mold assembly that defines an infiltration chamber, wherein the mandrel is made of an M-based alloy selected from the group consisting of a titanium-based alloy, a nickel-based alloy, a copper-based alloy, a cobalt-based alloy, and a refractory metal-based alloy, depositing reinforcing materials into the infiltration chamber, infiltrating the reinforcing materials with a binder material and thereby generating a hard composite material, forming a joint between the mandrel and the hard composite material during infiltration, and attaching a shank to the mandrel.

C. A drilling assembly that includes a drill string extendable from a drilling platform and into a wellbore, a drill bit attached to an end of the drill string wherein the drill bit comprises a bit body comprising a reinforced composite material made of reinforcing particles infiltrated with a binder material, a plurality of cutting elements coupled to an exterior of the bit body, a mandrel positioned within the bit body and made of an M-based alloy selected from the group consisting of a titanium-based alloy, a nickel-based alloy, a copper-based alloy, a cobalt-based alloy, and a refractory metal-based alloy, and a shank coupled to the mandrel.

Each of embodiments A, B, and C may have one or more of the following additional elements in any combination: Element 1: wherein the infiltrated MMC drill bit comprises a drill bit selected from the group consisting of a fixed-cutter drill bit, a fixed-angle drill bit, a roller-cone drill bit, a coring drill bit, a bi-center drill bit, and an impregnated drill bit. Element 2: wherein selection of the reinforcing particles is based on the M-based alloy. Element 3: wherein selection of the binder material is based on the M-based alloy. Element 4: wherein the titanium-based alloy is selected from the group consisting of commercially pure titanium, titanium-oxygen, titanium-aluminum-vanadium, titanium-palladium, titanium-molybdenum-nickel, titanium-aluminum-tin, titanium-aluminum-tin-zirconium-molybdenum, titanium-vanadium-iron-aluminum, and titanium-aluminum-vanadium-chromium-zirconium-molybdenum. Element 5: wherein the nickel-based alloy is selected from the group consisting of commercially pure nickel, nickel-copper, nickel-chromium, nickel-chromium-iron, nickel-chromium-molybdenum, nickel-molybdenum, an austenitic nickel-chromium containing superalloy, an austenitic nickel-based superalloy, a nickel-chromium superalloy, a nickel-copper-chromium superalloy, and a nickel-based superalloy. Element 6: wherein the copper-based alloy is selected from the group consisting of commercially pure copper, copper-zinc, copper-zinc-nickel, copper-tin, copper-tin-aluminum, and copper-nickel. Element 7: wherein the copper-based alloy is selected from the group consisting of commercially pure cobalt, AMS 5789D, cobalt-chromium, cobalt-chromium-tungsten, cobalt-chromium-molybdenum, cobalt-chromium-nickel, cobalt-chromium-nickel-molybdenum, and a cobalt-based superalloy. Element 8: wherein the refractory metal-based alloy is selected from the group consisting of tantalum, tungsten, rhenium, molybdenum, niobium, hafnium, zirconium, and vanadium. Element 9: wherein the refractory metal-based alloy is selected from the group consisting of tantalum-tungsten, tantalum-tungsten-molybdenum, tantalum-tungsten-rhenium, tantalum-tungsten-molybdenum-rhenium, tantalum-tungsten-zirconium, tungsten-rhenium, tungsten-molybdenum, tungsten-rhenium-molybdenum, tungsten-molybdenum-hafnium, tungsten-molybdenum-zirconium, tungsten-ruthenium, niobium-vanadium, niobium-vanadium-titanium, niobium-zirconium, niobium-tungsten-zirconium, niobium-hafnium-titanium, and niobium-tungsten-hafnium. Element 10: wherein the shank is coupled to the mandrel via a joining process selected from the group consisting of inertial welding, a friction-stir weld, a friction weld, an inertial weld, an induction weld, a braze, diffusion bonding, transient liquid phase (TLP) bonding, and any combination thereof. Element 11: further comprising surface features defined on some or all of an exterior surface of the mandrel. Element 12: wherein the surface features are selected from the group consisting of small-scale undulations, crenellations, steps, waves, dimples, recesses, protrusions, nubs, fins, threads, miters, dovetails, knurling, and any combination thereof.

Element 13: further comprising selecting the reinforcing particles based on the material of the M-based alloy. Element 14: further comprising selecting the binder material based on the material of the M-based alloy. Element 15: wherein attaching the shank to the mandrel comprises coupling the shank to the mandrel using a joining process selected from the group consisting of inertial welding, a friction-stir weld, a friction weld, an inertial weld, an induction weld, a braze, diffusion bonding, transient liquid phase (TLP) bonding, and any combination thereof. Element 16: further comprising enhancing the joint between the mandrel and the hard composite material with surface features defined on some or all of an exterior surface of the mandrel.

Element 17: wherein the drill bit comprises a drill bit selected from the group consisting of a fixed-cutter drill bit, a fixed-angle drill bit, a roller-cone drill bit, a coring drill bit, a bi-center drill bit, and an impregnated drill bit. Element 18: wherein the shank is coupled to the mandrel via a joining process selected from the group consisting of inertial welding, a friction-stir weld, a friction weld, an inertial weld, an induction weld, a braze, diffusion bonding, transient liquid phase (TLP) bonding, and any combination thereof.

By way of non-limiting example, exemplary combinations applicable to A, B, and C include: Element 11 with Element 12.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An infiltrated metal-matrix composite (MMC) drill bit, comprising:
   a bit body comprising a reinforced composite material including reinforcing particles infiltrated with a binder material;
   a plurality of cutting elements coupled to an exterior of the bit body;
   a mandrel positioned within the bit body and made of a single M-based alloy selected from the group consisting of a titanium-based alloy, a nickel-based alloy, a copper-based alloy, a cobalt-based alloy, and a refractory metal-based alloy, wherein the element designated by "M" is the most prevalent element in the alloy composition; and
   a shank coupled to the mandrel.

2. The infiltrated MMC drill bit of claim 1, wherein the infiltrated MMC drill bit comprises a drill bit selected from the group consisting of a fixed-cutter drill bit, a fixed-angle drill bit, a roller-cone drill bit, a coring drill bit, a bi-center drill bit, and an impregnated drill bit.

3. The infiltrated MMC drill bit of claim 1, wherein selection of the reinforcing particles is based on the M-based alloy.

4. The infiltrated MMC drill bit of claim 1, wherein selection of the binder material is based on the M-based alloy.

5. The infiltrated MMC drill bit of claim 1, wherein the M-based alloy is a titanium-based alloy selected from the group consisting of commercially pure titanium, titanium-oxygen, titanium-aluminum-vanadium, titanium-palladium, titanium-molybdenum-nickel, titanium-aluminum-tin, titanium-aluminum-tin-zirconium-molybdenum, titanium-vanadium-iron-aluminum, titanium-aluminum-vanadium-chromium-zirconium-molybdenum, and any combination thereof.

6. The infiltrated MMC drill bit of claim 1, wherein the M-based alloy is a nickel-based alloy selected from the group consisting of commercially pure nickel, nickel-copper, nickel-chromium, nickel-chromium-iron, nickel-chromium-molybdenum, nickel-molybdenum, an austenitic nickel-chromium containing superalloy, an austenitic nickel-based superalloy, a nickel-chromium superalloy, a nickel-copper-chromium superalloy, a nickel-based superalloy, and any combination thereof.

7. The infiltrated MMC drill bit of claim 1, wherein the M-based alloy is a copper-based alloy selected from the group consisting of commercially pure copper, copper-zinc, copper-zinc-nickel, copper-tin, copper-tin-aluminum, copper-nickel, and any combination thereof.

8. The infiltrated MMC drill bit of claim 1, wherein the M-based alloy is a copper-based alloy selected from the group consisting of commercially pure cobalt, AMS 5789D, cobalt-chromium, cobalt-chromium-tungsten, cobalt-chromium-molybdenum, cobalt-chromium-nickel, cobalt-chromium-nickel-molybdenum, a cobalt-based superalloy, and any combination thereof.

9. The infiltrated MMC drill bit of claim 1, wherein the M-based alloy is a refractory metal-based alloy selected from the group consisting of tantalum, tungsten, rhenium, molybdenum, niobium, hafnium, zirconium, vanadium, and any combination thereof.

10. The infiltrated MMC drill bit of claim 1, wherein the M-based alloy is a refractory metal-based alloy selected from the group consisting of tantalum-tungsten, tantalum-tungsten-molybdenum, tantalum-tungsten-rhenium, tantalum-tungsten-molybdenum-rhenium, tantalum-tungsten-zirconium, tungsten-rhenium, tungsten-molybdenum, tungsten-rhenium-molybdenum, tungsten-molybdenum-hafnium, tungsten-molybdenum-zirconium, tungsten-ruthenium, niobium-vanadium, niobium-vanadium-titanium, niobium-zirconium, niobium-tungsten-zirconium, niobium-hafnium-titanium, niobium-tungsten-hafnium, and any combination thereof.

11. The infiltrated MMC drill bit of claim 1, wherein the shank is coupled to the mandrel via a joining process selected from the group consisting of inertial welding, a friction-stir weld, a friction weld, an inertial weld, an induction weld, a braze, diffusion bonding, transient liquid phase (TLP) bonding, and any combination thereof.

12. The infiltrated MMC drill bit of claim 1, further comprising surface features defined on some or all of an exterior surface of the mandrel.

13. The infiltrated MMC drill bit of claim 12, wherein the surface features are selected from the group consisting of small-scale undulations, crenellations, steps, waves, dimples, recesses, protrusions, nubs, fins, threads, miters, dovetails, knurling, and any combination thereof.

14. A method of fabricating an infiltrated metal-matrix composite (MMC) drill bit, comprising:
   positioning a mandrel in an interior of a mold assembly that defines an infiltration chamber, wherein the mandrel is made of a single M-based alloy selected from the group consisting of a titanium-based alloy, a nickel-based alloy, a copper-based alloy, a cobalt-based alloy, and a refractory metal-based alloy;
   depositing reinforcing materials into the infiltration chamber;
   infiltrating the reinforcing materials with a binder material and thereby generating a hard composite material;

forming a joint between the mandrel and the hard composite material during infiltration; and
attaching a shank to the mandrel.

15. The method of claim 14, further comprising selecting the reinforcing particles based on the material of the M-based alloy.

16. The method of claim 14, further comprising selecting the binder material based on the material of the M-based alloy.

17. The method of claim 14, wherein attaching the shank to the mandrel comprises coupling the shank to the mandrel using a joining process selected from the group consisting of inertial welding, a friction-stir weld, a friction weld, an inertial weld, an induction weld, a braze, diffusion bonding, transient liquid phase (TLP) bonding, and any combination thereof.

18. The method of claim 14, further comprising enhancing the joint between the mandrel and the hard composite material with surface features defined on some or all of an exterior surface of the mandrel.

19. A drilling assembly, comprising:
a drill string extendable from a drilling platform and into a wellbore;
a drill bit attached to an end of the drill string wherein the drill bit comprises:
a bit body comprising a reinforced composite material made of reinforcing particles infiltrated with a binder material;
a plurality of cutting elements coupled to an exterior of the bit body;
a mandrel positioned within the bit body and made of a single M-based alloy selected from the group consisting of a titanium-based alloy, a nickel-based alloy, a copper-based alloy, a cobalt-based alloy, and a refractory metal-based alloy; and
a shank coupled to the mandrel.

20. The drilling assembly of claim 19, wherein the drill bit comprises a drill bit selected from the group consisting of a fixed-cutter drill bit, a fixed-angle drill bit, a roller-cone drill bit, a coring drill bit, a bi-center drill bit, and an impregnated drill bit.

21. The drilling assembly of claim 19, wherein the shank is coupled to the mandrel via a joining process selected from the group consisting of inertial welding, a friction-stir weld, a friction weld, an inertial weld, an induction weld, a braze, diffusion bonding, transient liquid phase (TLP) bonding, and any combination thereof.

* * * * *